(12) United States Patent
Cirette et al.

(10) Patent No.: US 9,115,832 B2
(45) Date of Patent: Aug. 25, 2015

(54) ASSEMBLY FOR FASTENING, WITH FLUID CONNECTION, A MOLD BOTTOM TO A HOLDER

(71) Applicants: Damien Cirette, Octeville sur Mer (FR); Arnaud Prieur, Octeville sur Mer (FR)

(72) Inventors: Damien Cirette, Octeville sur Mer (FR); Arnaud Prieur, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/359,677

(22) PCT Filed: Dec. 3, 2012

(86) PCT No.: PCT/EP2012/074255
§ 371 (c)(1),
(2) Date: May 21, 2014

(87) PCT Pub. No.: WO2013/083523
PCT Pub. Date: Jun. 13, 2013

(65) Prior Publication Data
US 2014/0284916 A1 Sep. 25, 2014

(30) Foreign Application Priority Data
Dec. 8, 2011 (FR) ...................... 11 61314

(51) Int. Cl.
*B29C 49/48* (2006.01)
*B29C 33/04* (2006.01)
*B29C 33/30* (2006.01)
*F16L 21/08* (2006.01)
*B29L 31/00* (2006.01)

(52) U.S. Cl.
CPC ................. *F16L 21/08* (2013.01); *B29C 33/04* (2013.01); *B29C 33/306* (2013.01); *B29C 2049/4828* (2013.01); *B29C 2049/4843* (2013.01); *B29C 2049/4858* (2013.01); *B29L 2031/7158* (2013.01)

(58) Field of Classification Search
CPC .. B29C 33/04; B29C 33/306; B29C 49/4823; B29C 49/48; B29C 2049/4828; B29C 2049/4823; B29C 2049/4858; B29C 2049/4843; F16L 21/08
See application file for complete search history.

(56) References Cited

U.S. PATENT DOCUMENTS

| | | | |
|---|---|---|---|
| 8,348,658 B2* | 1/2013 | Dagorn | 425/195 |
| 8,408,893 B2* | 4/2013 | Stoiber et al. | 425/182 |
| 8,485,809 B2 | 7/2013 | Dagorn et al. | |
| 8,714,957 B2* | 5/2014 | Blochmann et al. | 425/182 |
| 8,915,729 B2* | 12/2014 | Zoppas et al. | 425/182 |
| 2004/0052892 A1* | 3/2004 | Linke et al. | 425/542 |
| 2011/0223275 A1 | 9/2011 | Dagorn et al. | |
| 2013/0224325 A1* | 8/2013 | Langlois | 425/541 |

FOREIGN PATENT DOCUMENTS

| | | |
|---|---|---|
| DE | 10 2009 054385 | 7/2011 |
| FR | 2 902 688 | 12/2007 |
| WO | 2008/000938 | 1/2008 |

OTHER PUBLICATIONS

International Search Report dated Mar. 1, 2013, corresponding to PCT/EP2012/074255.

* cited by examiner

*Primary Examiner* — Robert B Davis
(74) *Attorney, Agent, or Firm* — Young & Thompson (57) ABSTRACT

Disclosed is an assembly (10) for fastening, with fluid connection, a mold bottom to a holder (12), in which the mold bottom, of principal axis (O), is able to be removably fastened to a plate (14) forming an interface between the mold bottom and the holder (12), the assembly (10) including at least one locking device and a fluid connection device, respectively placed between the plate (14) and the holder (12), characterized in that the movement of a first locking element (44) and a first connecting element (46) is coupled via a moveable part (88) so that together they form a moveable element.

20 Claims, 7 Drawing Sheets

ASSEMBLY FOR FASTENING, WITH FLUID CONNECTION, A MOLD BOTTOM TO A HOLDER

The present invention concerns an assembly for fastening, with fluid connection, a mold bottom to a holder.

The invention relates to the field of the fabrication of containers, notably by blow-molding or by drawing-blow-molding.

The containers are blow-molded in a mold including a cavity into which a preheated preform or blank (generally made of thermoplastic material) is inserted, this preform being pressurized to confer on it a required shape corresponding to that of the cavity.

In one known design, the molds are made in three parts: two half-molds, articulated in a plan perpendicular to a main axis of the mold, either in translation or in rotation about a common hinge (in which case the mold is referred to as of the "wallet" type), and a mold bottom movable parallel to the axis of the mold.

The molds are generally temperature-regulated, either to cool them in the commonest applications or to heat them in HR (heat resistant) type applications, in which the containers are heat set by retaining them temporarily in the heated mold to make them mechanically resistant to shrinkage when filled with a hot substance.

To this end, the half-molds and the mold bottom include pipes for circulating a heat-exchange fluid (generally oil or water).

In an open configuration, the two half-molds are moved away from each other and the mold bottom is in a low position, which enables evacuation of a formed container and the introduction of a new preform.

In a closed configuration, the mold bottom is in a high position and the two half-molds are closed onto it.

In order to make the mold bottom interchangeable, in particular to allow the fabrication of different ranges (and shapes) of containers in the same machine, the mold bottom is usually fixed to a sliding holder including a pipe for feeding the heat-exchange fluid and an evacuation pipe.

Consequently, a combination of means is employed for reversible fixing of the mold bottom to the holder (also known as a "plate") and for making the fluid connection with fluid-tight continuity for the circulation of the heat-exchange fluid.

The document DE-10.2009.054385 describes and shows one non-limiting example of such an assembly for fastening, with fluid connection, a mold bottom to a holder.

The document WO-2008/000938 describes and shows another example of an assembly for fixing a mold bottom to a holder with fluid connection.

Figure 2:
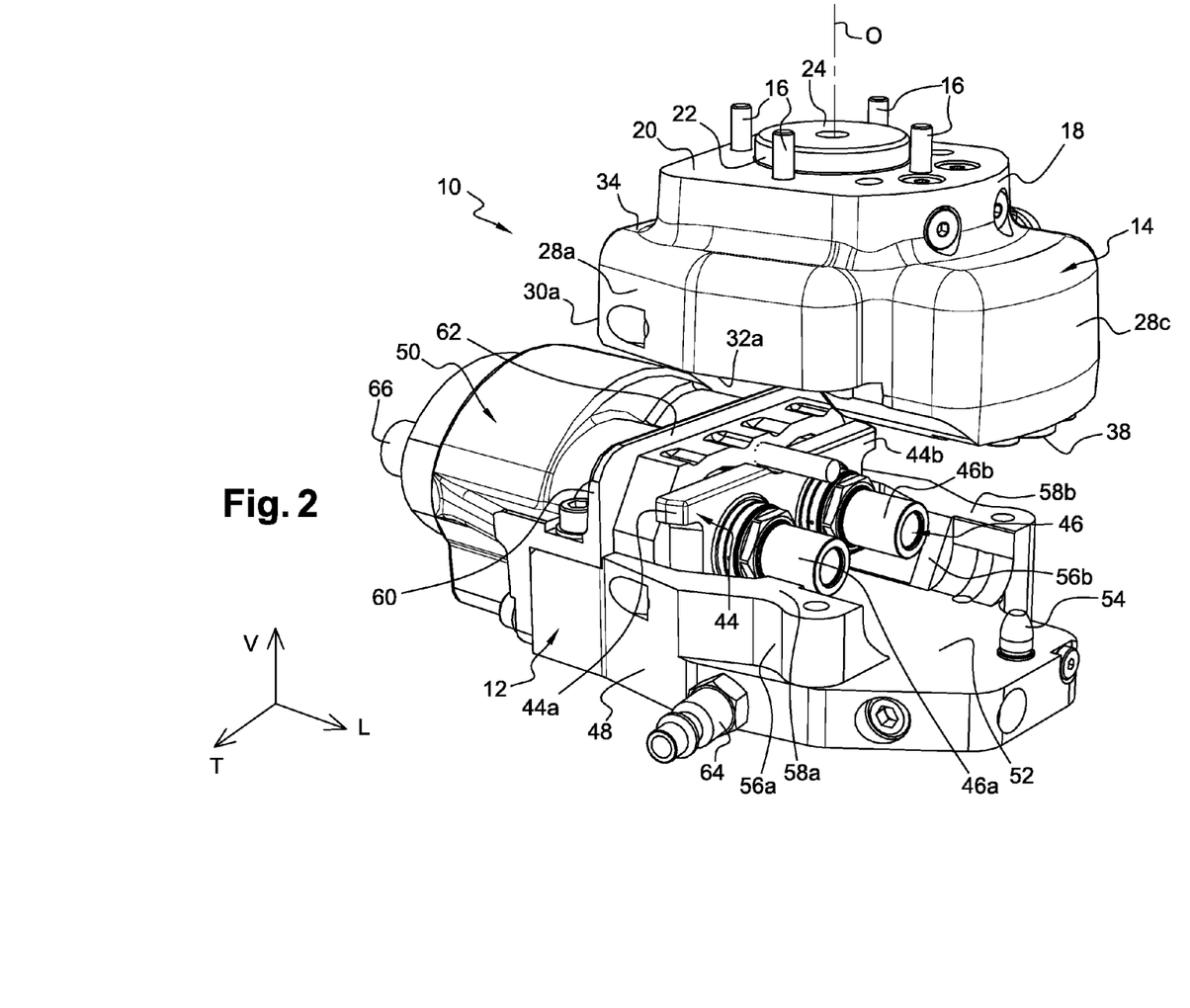
FIG. 2 is a perspective view that shows the assembly from FIG. 1 before mounting the plate on the holder or after demounting it therefrom.
Figure 3:
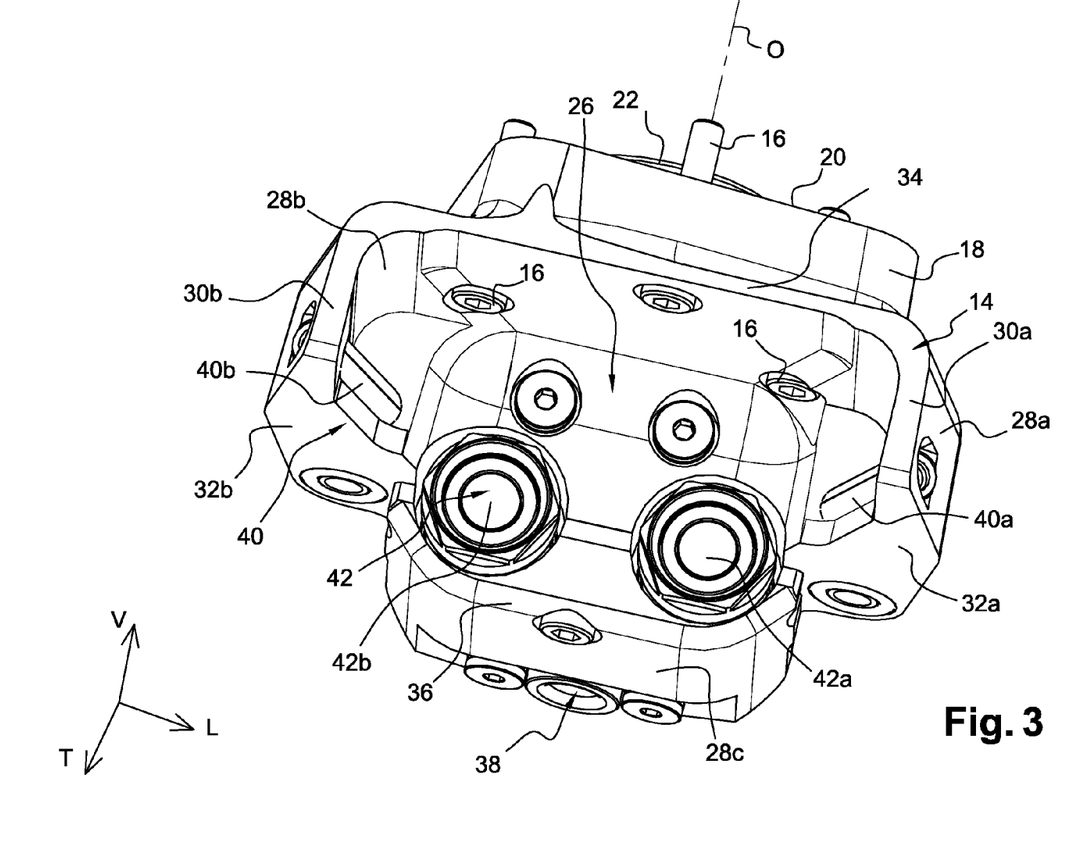
FIG. 3 is a bottom perspective view of the plate that notably shows the second locking means and the second connecting means.

According to the latter document, and as shown in FIGS. 2 and 3, the mold bottom is adapted to be removably or demountably fastened to a plate that forms an interface between the mold bottom and said holder and the assembly primarily includes a controlled ball-type locking device and a fluid connection device.

The ball-type locking device has various disadvantages. In fact, apart from being a complex assembly, such a device is particularly costly because it necessitates numerous walls and requires the use of material having an appropriate hardness relative to the walls as well as highly accurate machining.

The holder of the assembly has a large overall size in the direction of the main axis of the mold bottom, which is problematic in that it commensurately limits the maximum height of the containers that can be fabricated in the mold of which the mold bottom is part.

To accommodate the overall size of the assembly in the axial direction, the connecting means of the fluid connection device are chosen to enable connection with a very short travel, which commensurately limits design freedom and leads to the use of more costly connecting means.

The object of the present invention is notably to eliminate the aforementioned disadvantages and to propose a new design of assembly for fastening, with fluid connection, a mold bottom to a holder that is very particularly simple, reliable, of lower cost and fast in order to reduce the time necessary for changing a mold bottom.

To this end, the invention proposes an assembly for fastening, with fluid connection, a mold bottom to a holder, in which the mold bottom with its main axis O is adapted to be demountably fastened to a plate forming an interface between the mold bottom and said holder, said assembly including at least:
  a locking device which, operative between the plate and the holder, includes first locking means carried by the holder and complementary second locking means carried at least by the plate, said locking device being able to occupy at least:
  a locked state in which the plate is fastened to said holder, and
  an unlocked state in which the plate is free to be demounted from or mounted on said holder; and
  a fluid connection device which, operative between the plate and the holder, includes at least first connecting means carried by the holder and adapted to cooperate with second connecting means carried by the plate, the fluid connection device being able to occupy at least:
  a connected state in which a fluid circuit of the mold bottom is formed by virtue of the fluid connection established between the holder and the plate by said first connecting means assembled with the second connecting means, and
  a separated state in which, said first connecting means being separated from the second connecting means, said fluid circuit of the mold bottom is interrupted between the holder and the plate.

According to the invention, such an assembly is characterized in that the first locking means and the first connecting means are connected so as to move together by means of a mobile part so as together to form a mobile subassembly.

The mobile subassembly in accordance with the invention formed by a mobile wall to which the first locking means and the first connecting means are fastened and thus connected to move together enables design of an assembly that has numerous advantages over the prior art.

These advantages very particularly include, because of the absence of walls, simple fabrication (choice of materials, absence of costly treatments, easy assembly, etc.), and reliability in use (absence of the risk of jamming that exists with balls).

An assembly in accordance with the invention also enables time to be saved during operations of mounting and demounting a mold bottom as locking and establishing the fluid connection, and likewise unlocking and interrupting the fluid connection, are advantageously obtained simultaneously by driving movement of the mobile subassembly by means of the associated actuating device.

In accordance with other features of the invention:
  the plate being mounted on the holder, locking and establishing the fluid connection, and likewise unlocking and interrupting the fluid connection, are obtained simultaneously by driving movement of said mobile subassembly;

said mobile subassembly is adapted to be moved between at least:

a first position in which the locking device occupies the locked state and the fluid connection device occupies the connected state, and a second position in which the locking device occupies the unlocked state and the fluid connection device occupies the separated state;

said mobile subassembly moves between said first and second positions in a direction that is not parallel to the main axis O of the mold bottom, notably in a direction orthogonal to the main axis O of the mold bottom;

return spring means are disposed between said part formed by a mobile wall and a fixed partition of the holder so as to urge said mobile wall toward at least one of said first and second positions;

the return spring means urge the mobile wall toward the first position of the mobile subassembly so as to obtain on the one hand automatic return to the locked state and on the other hand assistance with the fluid connection when assembling the first connecting means and the second connecting means;

the assembly includes an actuating device which, associated with said mobile subassembly, is adapted to act selectively on the mobile subassembly to drive movement thereof between the first and second positions;

the actuating device includes at least one actuating member that is connected directly or indirectly to said mobile wall to bring about selectively the movement of the mobile subassembly between at least said first position in which the first locking means cooperate with the second locking means to fasten the plate to the holder and in which the first connecting means are engaged in the second connecting means of the plate to establish the fluid connection and said second position in which the plate is free relative to the holder, the retracted first locking means not cooperating with the second locking means of the holder, and in which the first connecting means are retracted so as not to interfere with the plate and by virtue of their retraction interrupt the fluid connection;

the actuating device is an actuator including at least one chamber associated with a piston which, forming an actuating member, is mounted in fluid-tight manner in a bore of the holder and driven by means of said chamber to drive movement of said mobile subassembly between said first and second positions;

the first connecting means comprise at least one male-type spigot that is adapted to be received in a complementary female-type connector forming the second connecting means;

the first and second connecting means are at least duplicated, the first connecting means including at least one feed spigot and one evacuation spigot for the heat-exchange fluid respectively associated with two complementary connectors for establishing the fluid connection of the fluid circuit;

the holder includes an inlet connector which, connected to the feed spigot, is adapted to be connected to a heat-exchange fluid feed pipe and an outlet connector which, connected to the evacuation spigot, is adapted to be connected to a heat-exchange fluid evacuation pipe;

the assembly includes centering means operative between the plate and the holder, said centering means including at least one centering pin carried by the holder and extending parallel to the main axis O that is received in a complementary hole in the plate when said plate is mounted on the holder in the direction of the main axis O;

the first locking means carried by the mobile wall comprise at least two arms each adapted to cooperate with a complementary pin of the plate forming said second locking means;

the first locking means carried by the mobile wall consist of a first pair of arms each adapted to cooperate with a pin that the plate includes and a second pair of arms each adapted to cooperate with a pin that the holder includes so that the forces arising during locking effected to fasten together the plate and the holder are absorbed by said holder;

the pins forming the second locking means are disposed obliquely to the direction of movement of the mobile subassembly, orthogonal to the main axis O of the mold bottom, so as to reduce the travel necessary to produce a change of state of the locking device and the fluid connection device;

the holder includes at least one connector for supplying fluid, such as compressed air, at least to the chamber of the actuator forming the associated actuating device.

Other features and advantages of the invention will become apparent on reading the following detailed description, to understand which reference should be made to the appended drawings, in which.

In the description and the claims, by convention and in a manner that is not limiting on the invention, the terms "front" and "rear" refer to the longitudinal direction, "upper" and "lower" refer to the vertical direction independent of terrestrial gravity, and the longitudinal, vertical and transverse directions refer to the system of axes (L, V, T) indicated in the figures.

Figure 1:
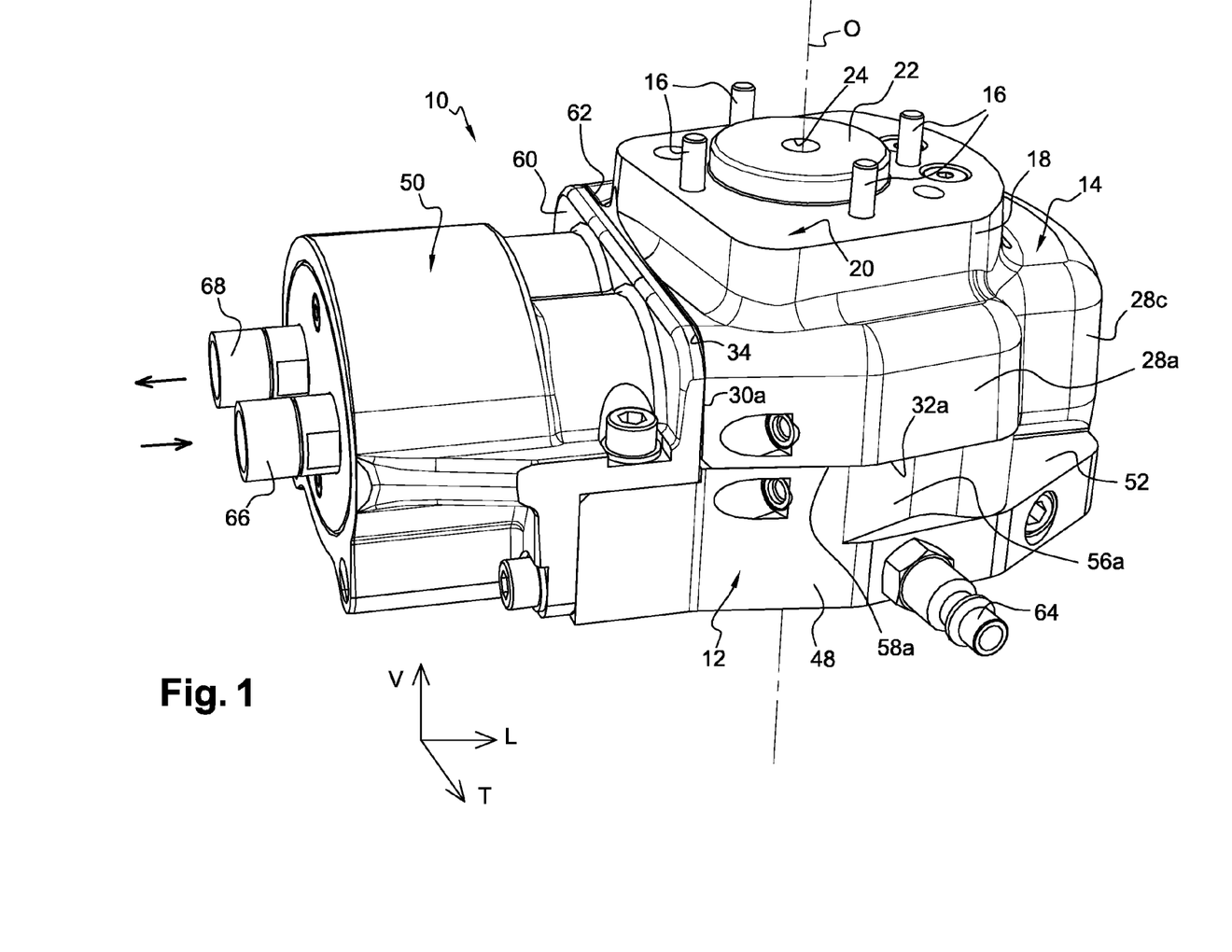
FIG. 1 is a lateral perspective of one embodiment of an assembly in accordance with the invention showing a plate which, associated with the mold bottom, is mounted on a holder.

There is represented in FIG. 1 an assembly 10 for fastening, with fluid connection, a mold bottom (not represented) to a holder 12.

In known manner, the mold bottom includes in its upper part a recessed imprint corresponding to the bottom of the container to be fabricated, a mold bottom of this kind with a petal-like imprint being represented in FIG. 1 of the aforementioned document WO-2008/000938, for example.

Said assembly 10 merely constitutes an example adapted to illustrate the invention and consequently has no limiting character.

The mold bottom is preferably adapted to be demountably fastened to a plate 14 forming an interface between the mold bottom and said holder 12.

FIG. 1 represents the plate 14 mounted on the holder 12 of the assembly 10 while FIG. 2 represents it demounted, separated from each other.

Such a two-part design advantageously enables the manufacture of each of said parts to be optimized, notably in terms of the choice of materials employed, fabrication complexity to be reduced relative to a "multifunction" single part, and fabrication costs to be reduced.

Moreover, in such a design, the plate 14 and the holder 12 are associated with a given mold and are standardized. In fact, one and the same plate 14 is adapted to allow fixing of a plurality of different mold bottoms corresponding to as many different containers to be fabricated.

Alternatively, the mold bottom and the plate 14 are produced in one piece into which the means for fastening them to the holder 12 and the fluid connecting means for cooling or heating are integrated, and this applies to each mold bottom.

The mold bottom has a main axis O.

By convention, here the main axis O is vertically oriented according to the system of axes (L, V, T), without reference to terrestrial gravity, and said main axis O is common to the mold bottom and to the plate 14.

The mold bottom is preferably bolted to the plate 14, for example by means of bolts 16 fastened to the plate 14 the threaded shanks of which are received in complementary tapped holes of the mold bottom.

As shown in FIGS. 1 and 2, there are four bolts 16 that are vertical, i.e. parallel to the main axis O of the mold bottom and the plate 14, and are oriented with the head at the bottom.

There will be described firstly hereinafter the plate 14 that is represented in association with the holder 12 in FIGS. 1 and 2, and more particularly in FIG. 3.

The plate 14 includes an upper portion forming a base 18 adapted to receive the mold bottom. The base 18 delimits a horizontal upper face 20 through which pass the threaded shanks of the bolts 16 and which includes centrally a nipple 22 projecting upward relative to the horizontal upper face 20.

The nipple 22 of the base 18 includes at its center at least one orifice 24 adapted to allow the heat-exchange fluid to pass from the plate 14 to the mold bottom.

The plate 14 includes a lower portion which, lying under the base 18 forming the upper portion, globally delimits a housing 26 such that said hollow lower portion of the plate 14 is open vertically downward and longitudinally toward the rear.

The lower portion of the plate 14 includes two longitudinally oriented flanges 28a and 28b connected transversely to each other by a portion 28c that closes said housing 26 longitudinally toward the front.

The flange 28a includes at its rear free end a longitudinal edge 30a oriented vertically and a longitudinal edge 32a oriented longitudinally and in the same manner the flange 28b that is transversely opposite the flange 28a includes an edge 30b oriented vertically and an edge 32b oriented longitudinally.

The vertical edges 30a and 30b are connected transversely by an upper edge 34.

The longitudinal edges 32a and 32b are connected transversely by a lower edge 36 of the portion 28c.

The plate 14 includes a hole 38 in said portion 28c arranged longitudinally at the front of its lower portion and delimiting the housing 26, the hole 38 being open vertically downward.

As shown in FIG. 3, the plate 14 includes second locking means 40 and second connecting means 42.

The second locking means 40 preferably consist of at least two pins 40a and 40b each of which is carried by a respective flange 28a, 28b of the lower portion of the plate 14 and that lie inside the housing 26.

The pins 40a and 40b are advantageously arranged obliquely relative to the longitudinal direction.

The pins 40a, 40b constitute simple and economical means that are mounted on and bolted to the flanges 28a, 28b of the plate 14, for example.

The second locking means 40 are adapted to cooperate selectively with first locking means 44 carried by the holder 12 and to be described in detail later.

The second connecting means 42 carried by the plate 14 are adapted to cooperate selectively with first connecting means 46 carried by the holder 12 and to be described in detail later.

The first connecting means 46 preferably consist of at least one male-type spigot that is adapted to be received in a complementary female-type connector forming the second connecting means 42.

As shown in FIGS. 2 and 3, the fluid connecting means 42 include two female-type connectors 42a and 42b adapted to receive respective complementary male-type spigots 46a and 46b.

The first and second connecting means are therefore advantageously at least duplicated, the first connecting means 46 including at least one heat-exchange fluid feed spigot 46a and one heat-exchange fluid evacuation spigot 46b.

Said spigots 46a, 46b are associated with the respective complementary connectors 42a and 42b to establish the fluid connection of the circuit.

The spigots 46a, 46b and the associated connectors 42a, 42b together forming the fluid connection device preferably employ "self-blocking" type connecting means.

Accordingly, the assembly 10 includes a fluid connection device which, operative between the plate 14 and the holder 12, includes at least said first connecting means 46 carried by the holder 12 that are adapted to cooperate with the second connecting means 42 carried by the plate 14.

The fluid connection device of the assembly 10 is advantageously adapted to occupy at least a connected state and a separated state.

The connected state corresponds to a state in which a fluid circuit of the mold bottom is formed by virtue of the fluid connection established between the holder 12 and the plate 14 by said first connecting means 46 assembled with the second connecting means 42 to enable circulation of the heat-exchange fluid.

The separated state corresponds to a state in which, said first connecting means 46 being separated from the second connecting means 42, said fluid circuit of the mold bottom is interrupted between the holder 12 and the plate 14.

The assembly 10 includes a locking device which, operative between the plate 14 and the holder 12, includes first locking means 44 carried by the holder 12 and complementary second locking means 40 carried at least by the plate 14.

The locking device of the assembly 10 is advantageously adapted to occupy at least a locked state and an unlocked state.

The locked state of the locking device corresponds to a state in which the plate 14 is fastened to said holder 12 and the unlocked state corresponds to a state in which the plate 14 is free to be demounted from or mounted on said holder 12.

There will now be described, notably with reference to FIG. 2, the holder 12 adapted to receive the plate 14 together with which it forms the mold bottom and then in this embodiment said first locking means 44 and said first connecting means 46 operative between the holder 12 and the plate 14.

The holder 12 includes a body 48 that extends globally longitudinally. The body 48 of the holder 12 includes a front portion conformed as a base that is complementary to the plate 14 to be mounted on it and a rear portion receiving an associated actuating device 50.

The base of the holder 12 notably includes a horizontal face 52 with at the front end centering means, such as a pin 54, adapted to be received in the hole 38 in the plate 14.

When the plate 14 is mounted on the holder 12, the face 52 therefore receives mainly the portion 28c of the plate 14.

The front portion of the holder 12 longitudinally opposite the centering pin 54 is delimited transversely by two longitudinally oriented flanges 56a and 56b.

The flange 56a includes an upper edge 58a and the flange 56b includes an upper edge 58b, said edges 58a and 58b being adapted to cooperate with the edges 32a and 32b of the lower portion of the plate 14 when said plate 14 is mounted on the holder 12 as shown in FIG. 1.

The holder 12 further includes, centrally, a portion forming an arch 60 which, extending transversely, delimits an edge 62 adapted to cooperate with the edge 34 of the plate 14 when said plate 14 is mounted on the holder 12.

In addition to the centering pin 54, the edges 58a, 58b and 62 also participate in centering the plate 14 relative to the holder 12 when said plate 14 is mounted thereon so that the combination constitutes centering means operative between the plate 14 and the holder 12.

The body 48 of the holder 12 includes at least one connector 64 adapted to allow supply of a fluid, in particular compressed air, for example at a pressure of the order of 7 bar.

The holder 12 includes an inlet connector 66 which, connected to the feed spigot 46a, is adapted to be connected to a heat-exchange fluid feed pipe (not represented) and an outlet connector 68 which, connected to the evacuation spigot 46b, is adapted to be connected to a heat-exchange fluid evacuation pipe (not represented).

In the transverse direction the inlet connector 66 and the outlet connector 68 are arranged side-by-side and in the longitudinal direction they are at the rear end of the holder 12.

Figure 4:
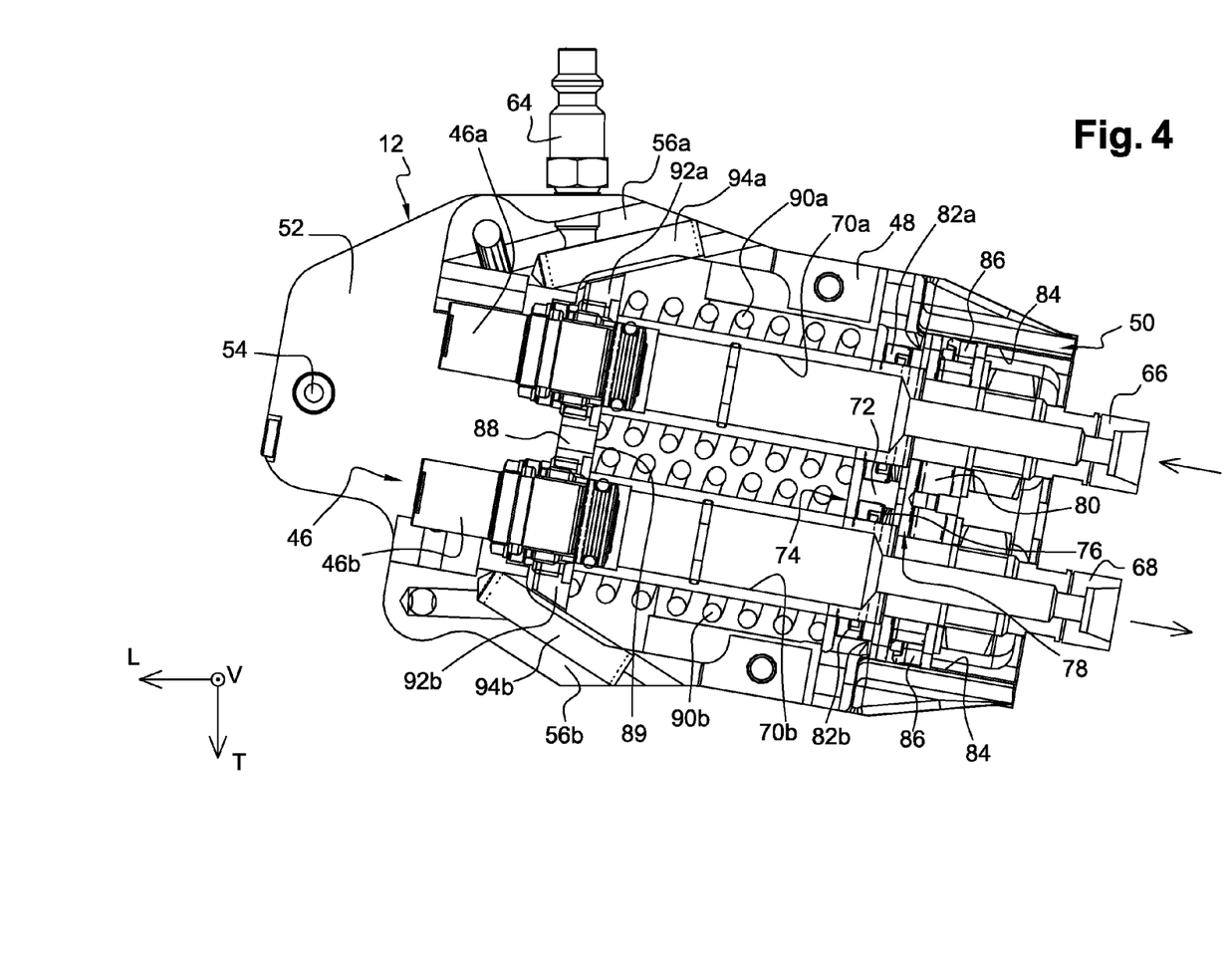
FIG. 4 is a sectional view that shows the holder on its own pending mounting of a plate carrying a mold bottom and that shows the mobile subassembly in the first position corresponding to the locked and connected states.
Figure 5:
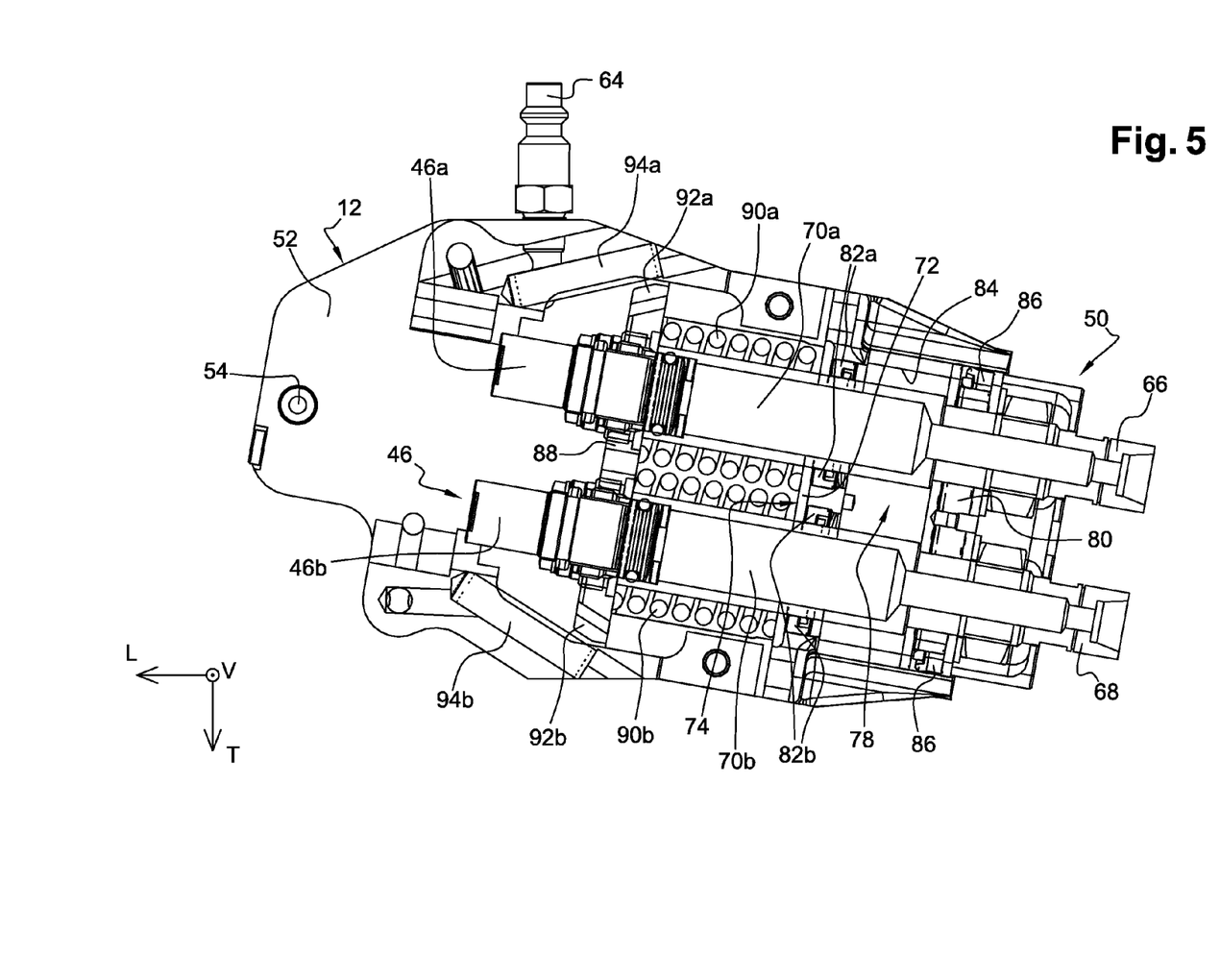
FIG. 5 is a sectional view that shows the holder on its own pending mounting of a plate carrying a mold bottom and that shows the mobile subassembly in the second position corresponding, after actuation, to the unlocked and separated states.
Figure 6:
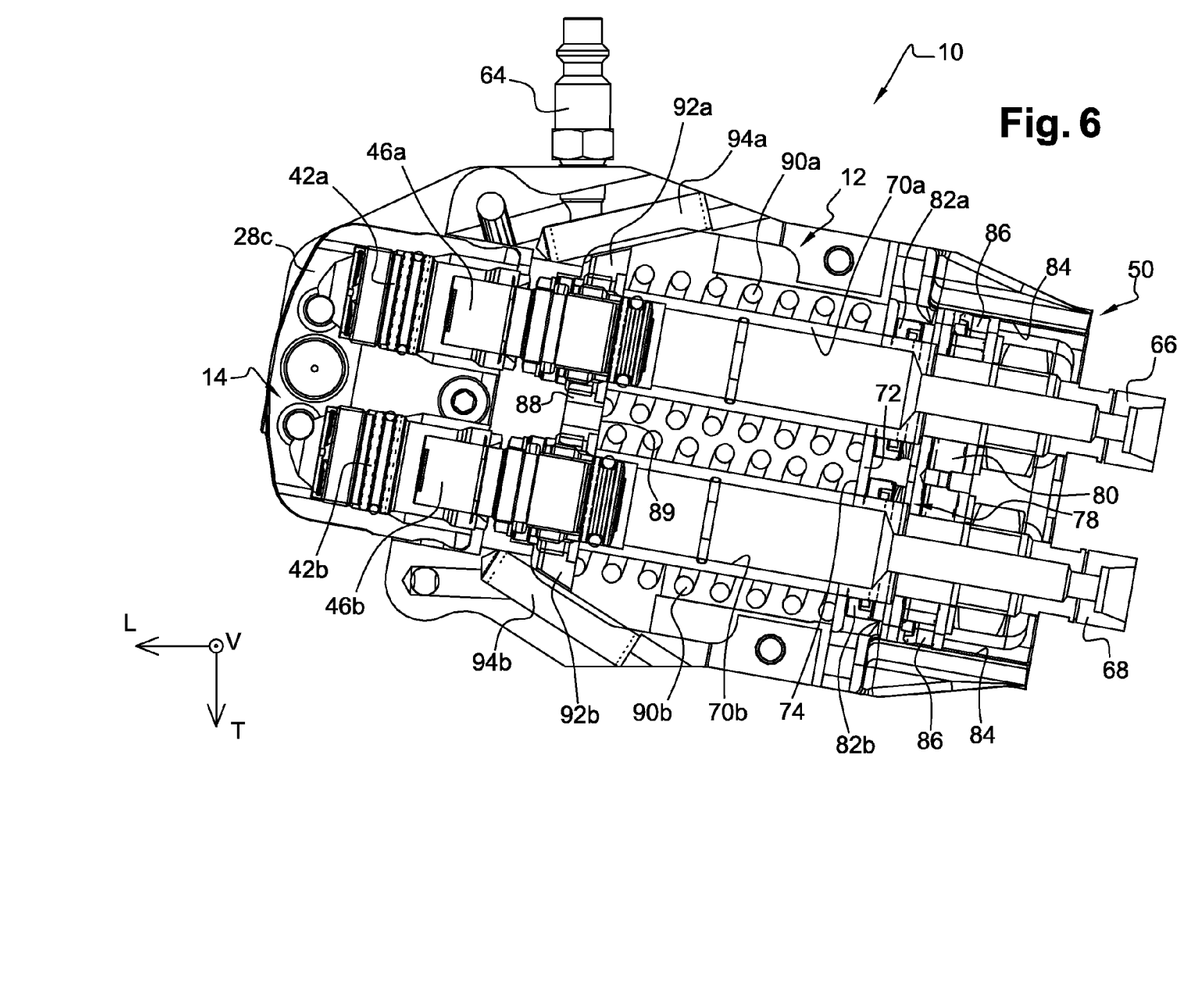
FIG. 6 is a sectional view that shows the holder from FIGS. 4 and 5 on which a plate has been mounted and that shows, after the mobile subassembly has returned from the second position to the first position, the locking device in the locked state and the connecting device in the connected state.

As shown in FIGS. 4 to 6, the inlet connector 66 and the spigot 46a are connected to each other via a pipe section 70a, which pipe section 70a connects them longitudinally together through the actuating device 50.

In an analogous manner, the outlet connector 68 and the evacuation spigot 46b are connected to each other via a pipe section 70b, which pipe section 70b connects them longitudinally together through the actuating device 50.

The pipe section 70a and the pipe section 70b therefore extend longitudinally, parallel to each other, from the connectors 66, 68 at the rear of the holder 12 to the spigots 46a, 46b at the front.

The pipe section 70a and the pipe section 70b pass through a fixed partition 72 of the holder 12 that extends transversely and includes a front face 74 and a rear face 76.

The actuator device 50 is preferably an actuator including at least one chamber 78 (see FIG. 5) that is associated with a mobile piston 80.

The actuator 50 is advantageously of pneumatic type and adapted to be fed selectively with fluid thanks to the connector 64 that is adapted to be connected to a compressed air supply.

Alternatively, the actuator 50 is a hydraulic type actuator. More generally, numerous different types of actuator may be employed in the actuating device 50, notably but not in a manner limiting on the invention an electric, electromechanical or electromagnetic actuator.

However, the pneumatic actuator 50 is advantageous in that it can easily be fed with compressed air when such an energy supply is already present and available at the station including the mold in which the preform is transformed into a container by blow molding or by stretch blow molding. However, the compressed air will preferably be fed from outside the blow molding station, via a quick connector or an automatic connection, in order to have a physical disconnection of the supply during production to prevent any unintentional disconnection.

The chamber 78 is delimited transversely on the one hand at the front by the rear face 76 of the partition 72 and on the other hand at the rear by the front face of the piston 80.

To provide the seal at the front of said chamber 78, first sealing means are provided at the level of the fixed partition 72 and of each of the pipe sections 70a, 70b passing through said partition 72.

The sealing means 82a and 82b consist of seals such as lip seals, for example.

The piston 80 is adapted to be driven selectively by said chamber 78.

The piston 80 is slidably mounted in a bore 84 of the actuator 50, said actuator 50 being fastened to the holder 12.

The seal at the rear of the chamber 78 is provided by second sealing means 86 disposed between the piston 80 and the bore 84.

The second sealing means 86 consist of at least one seal such as a lip seal, for example, around the piston 80, which is generally oval in shape.

The first connection means 46 formed by the spigots 46a, 46b are connected to the piston 80 of the actuating device 50 to move with it.

The spigots 46a, 46b are preferably connected directly to the piston 80 via pipe sections 70a, 70b, respectively, fastened to them.

When the piston 80 slides longitudinally from the front towards the rear and vice versa in the bore 84, the first connection means 46 are then also moved.

In accordance with the invention, the first locking means 44 and the first connecting means 46 are connected so as to move together by means of a mobile wall 88 so as to together to form a mobile subassembly.

The first connecting means 46 are advantageously fastened to the mobile wall 88 so that said mobile wall 88 moves with the first connecting means 46 when said first connecting means 46 are moved by the actuating device 50.

The first locking means 44 also being carried by said mobile wall 88, a mobile subassembly including the wall 88, the first locking means 44 and the first connecting means 46 is obtained.

The mobile subassembly constitutes a unitary subassembly movement of which can be driven selectively by the actuating device 50, the first locking means 44 and the first connecting means 46 being moved to cause a change of state of the locking device and the connecting device, respectively.

The mobile wall 88 extends transversely, like the piston 80, and is adapted to be moved longitudinally from the front toward the rear and vice versa when the piston 80, driven by means of the chamber 78, slides in the bore 84.

Thus the mobile subassembly is adapted to be moved between at least a first position in which the locking device occupies the locked state and the fluid connection device occupies the connected state and a second position in which the locking device occupies the unlocked state and the fluid connection device occupies the separated state.

The mobile subassembly preferably slides in the longitudinal direction between said first and second positions.

The plate 14 being mounted on the holder 12, locking and fluid connection, likewise unlocking and interruption of the fluid connection, are advantageously obtained simultaneously by driving movement of said mobile subassembly by means of the actuating device 50.

Said mobile subassembly advantageously preferably moves between said first and second positions in a direction that is not parallel to the main axis O of the mold bottom.

Said mobile subassembly preferably moves between said first and second positions in a direction orthogonal to the main axis O of the mold bottom.

Return spring means are advantageously disposed between a rear face 89 of said mobile wall 88 and the fixed partition 72 of the holder 12 so as to urge said mobile wall 88 toward at least one said first and second positions.

The return spring means advantageously include at least a first spring 90a and a second spring 90b, each of the springs 90a, 90b extending longitudinally and having passed centrally through it the corresponding pipe section 70a, 70b so that said return springs 90a, 90b surround the pipe sections 70a and 70b.

The return spring means 90a, 90b preferably urge the mobile wall 88 toward the first position of the mobile subassembly so as to obtain on the one hand automatic return to the locked state and on the other hand assistance with the fluid connection when assembling the first connecting means 46 and the second connecting means 42.

The device 50 for actuating the assembly 10 formed by the actuator is adapted to act on the mobile subassembly selectively to drive movement thereof between the first and second positions against the action of the return springs 90a, 90b when the mobile subassembly is moved by the piston 80 from said first position (FIG. 4) to said second position (FIG. 5).

The piston 80 therefore constitutes an actuating member of the mobile subassembly that is advantageously connected, here directly but alternatively indirectly, to said mobile subassembly and the mobile wall 88, in particular via the pipe sections 70a and 70b.

The piston 80 forming the actuating member is adapted selectively to cause movement of said mobile subassembly between at least:

said first position in which the first locking means 44 cooperate with the second locking means 40 to fasten the plate 14 to the holder 12 and in which the first connecting means 46 are engaged in the second connecting means 42 of the plate 14 to establish the fluid connection, and said second position in which the plate 14 is free with respect to the holder 12, the retracted first locking means 44 not cooperating with the second locking means 40 of the holder 12, and in which the first connecting means 42 are retracted so as not to interfere with the plate 14 and by virtue of their retraction to interrupt the fluid connection.

The first locking means 44 carried by the mobile wall 88 consist of at least two arms 44a and 44b each adapted to cooperate with a respective one of the complementary pins 40a, 40b of the plate 14 forming all or part of said second locking means 40.

The first locking 44 carried by the mobile wall 88 preferably consist of a first pair of arms formed by said arms 44a and 44b, referred to as the upper arms, and a second pair of arms 92a and 92b, referred to as the lower arms.

The holder 12 advantageously includes two pins 94a and 94b that are carried by the flanges 56a and 56b and, in a manner analogous to those 40a, 40b of the plate 14, are arranged obliquely relative to the longitudinal direction of movement of the mobile subassembly, i.e. a direction orthogonal to the main axis O of the mold bottom.

The oblique arrangement of the pins 40a, 40b and 94a, 94b has the advantage that it reduces the travel necessary to produce a change of state of the locking device and the fluid connection device and above all of natural retraction of the locking means relative to the pins in the unlocked position.

When the mobile subassembly occupies said first position and a plate 14 is mounted on the holder 12, the upper arms 44a and 44b of the first pair cooperate with the pins 40a and 40b, respectively, of the plate 14 and the lower arms 92a and 92b of the second pair cooperate with the pins 94a and 94b, respectively, of the holder 12.

Compared to a locking device including only arms 44a and 44b, a locking device of this kind including first and second pairs of arms enables the holder 12 to absorb forces applied in the locked state, with no loading of the guidance of the mobile subassembly that essentially has to be guided to slide longitudinally.

Figure 7:
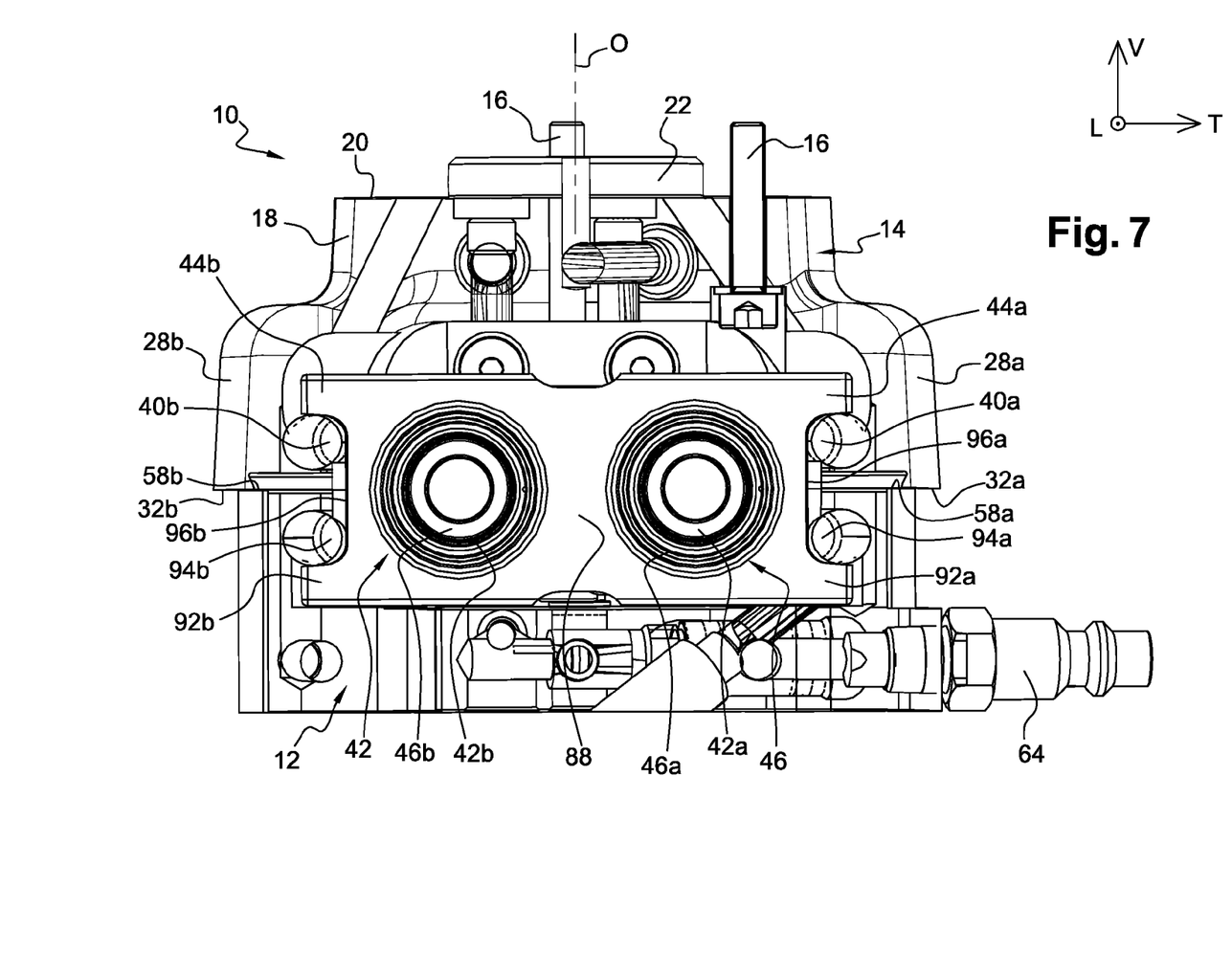
FIG. 7 is a sectional view of the assembly shown in FIG. 6 that shows in detail the cooperation between the first locking means and the second locking means when, a plate being mounted, the locking device occupies the locked state.

As shown in FIG. 7, the arms 44a and 92a are formed in the mobile wall 88 thanks to a notch 96a in which the corresponding pins 40a and 94a are received and are therefore gripped by said arms 44a, 92a.

In an analogous and symmetrical manner for the arms 44b and 92b located transversely opposite said arms 44a and 92a, the arms 44a and 92a are produced in the mobile wall 88 by virtue of a notch 96b in which the pins 40b and 94b are received when a plate 14 is mounted on the holder 12 and the mobile subassembly occupies the first position corresponding to the locked and connected states.

There will now be described the operation of the assembly 10 during mounting of a plate 14 on the holder 12 and then demounting thereof, notably to effect a change of mold bottom.

FIG. 4 represents the holder 12 awaiting mounting of a plate 14.

The mobile subassembly occupies the first position corresponding to the locked and connected states, toward which first position the return spring means formed by the springs 90a, 90b urge the mobile wall 88 carrying the first connecting means 46 formed by the spigots 46a, 46b and the first locking means 44 formed by the arms 40a, 40b and 92a, 92b.

To be able to mount a plate 14 on the base 48 of the holder, the mobile subassembly must be moved from its first position to its second position, i.e. actuated to slide longitudinally from the front toward the rear.

To do this, the holder 12 being fed with compressed air via the connector 64, compressed air is admitted into the chamber 78 of the pneumatic actuator forming the actuating device 50.

The increase in the pressure in the chamber 78 causes the piston 80 to slide longitudinally from the front toward the rear, moving away from the fixed partition 72.

The movement of the piston 80 is accompanied by simultaneous movement of the mobile subassembly if said assembly is connected, here without play, to the piston 80 so as to move with it, forming an actuating member for the latter.

Accordingly, the piston 80 loaded by the pressure established in the chamber 78 is moved longitudinally from the front toward the rear against the return springs 90a, 90b and, sliding in the bore 84, entrains the mobile wall 88 of the mobile subassembly until it reaches the second position represented in FIG. 5.

In this second position, the return springs 90a, 90b urging the mobile subassembly toward the first position are compressed.

When the mobile subassembly reaches the second position, the locking device is in the unlocked state, the lower arms 92a and 92b not being engaged to cooperate with the associated pins 94a and 94b of the holder 12.

The movement of the mobile subassembly to the second position advantageously enables longitudinal rearward retraction of the spigots 46a, 46b forming the first connecting means of the fluid connection device, thanks to which, when mounting the plate 14, there is no interference with the connectors 42a and 42b forming the second connecting means.

As represented in FIG. 5, the holder 12 is then able to receive a plate 14. The plate 14 is mounted in the vertical direction, parallel to the main axis O, downward toward the holder 12, notably so that the centering peg 54 engages in the complementary hole 38.

With the plate 14 mounted on the holder 12, the actuating device 50 then brings about a change of state of the locking and fluid connection devices.

The pneumatic actuator 50 is advantageously a single-acting actuator, given the presence of the return spring means 90a, 90b of the mobile subassembly.

Alternatively, the actuating device 50 is a double-acting actuator, especially if there are no return spring means.

The consequence of interrupting the supply of compressed air to the chamber 78 of the piston 80 is that the mobile subassembly is then automatically returned from the second position to the first position, said mobile subassembly and the piston 80 then sliding longitudinally from the rear toward the front.

A mobile subassembly of this kind advantageously makes it possible to obtain by virtue of the movement in translation between the first and second positions a long travel and above all connection assistance by virtue of the springs 90a, 90b urging the spigots 46a, 46b toward the front and the facing connectors 42a, 42b.

In fact, such connection assistance is particularly advantageous in the case of "self-blocking" type fluid connection means in order to overcome the resistance opposed when connecting to each spigot 46a, 46b, as much by the valve of the connector 42a, 42b as by the pressure of the heat-exchange fluid present.

As shown in FIG. 6, the assembly 10 is then ready to be used to fabricate containers, the mold bottom being fastened to the holder 12 via the plate 14 and the fluid connection established in order to proceed, according to the application, to the cooling or heating of said mold bottom by means of the heat-exchange fluid.

To proceed with demounting with a view to carrying out a change of mold bottom, the steps described above are carried out in the reverse order.

As shown in FIG. 6, the plate 14 being fastened to and connected to the holder 12, the actuating device 50 selectively drives the mobile subassembly from the first position to the second position.

To do this, compressed air is introduced into the chamber 78 and the pressure established causes retraction of the piston 80 which then slides from the front toward the rear entraining with it the mobile subassembly, i.e. the mobile wall 88 carrying the locking arms 44a, 44b and 92a, 92b and the spigots 46a and 46b.

The locking device then occupies the unlocked state, and the arms 44a, 44b no longer cooperating with the pins 40a, 40b present no obstacle to demounting of the plate 14 that is free to be demounted by pulling it longitudinally upward, parallel to the main axis O of the mold bottom and the plate 14.

Similarly, the fluid connection device then occupies the separated state in which the spigots 46a, 46b are retracted toward the rear and therefore are no longer engaged in the corresponding connectors 42a, 42b.

The plate 14 is adapted to have the holder 12 removed and then the mold bottom, fastened by the bolts 16 to the plate 14, unfastened from the plate 14 and changed for another mold bottom that is as previously fastened to the plate 14 by the bolts 16 before being mounted on the holder 12.

The mobile subassembly in accordance with the invention advantageously makes it possible to effect simultaneously locking/unlocking and the fluid connection, thanks to which the time required for a change of mold may be reduced.

The term locking means the change of the locking device from the unlocked state to the locked state and similarly the expression establish the fluid connection means the change from the separated state to the connected state.

Conversely, the term unlocking means the change of the locking device from the locked state to the unlocked state and similarly the expression interrupting the fluid connection means the change from the connected state to the separated state.

The mobile subassembly advantageously moves in a horizontal plane orthogonal to the main axis O, making it possible for the fluid connection means to have a long travel.

This kind of connection travel has a direct impact on the choice of connecting means (spigots and connectors), the diameter of which can be larger so as to reduce head losses, to increase the flow of heat-exchange fluid in circulation and therefore the thermal (cooling or heating) performance of the mold bottom.

An assembly 10 of this kind advantageously makes it possible to optimize the overall size in the vertical direction because, the holder 12 notably extending for the most part horizontally, it is possible to fabricate containers, such as bottles, of greater height in the same mold.

In a variant that is not shown, the mold bottom includes a temperature sensor and electrical connection means are then provided, notably between the plate 14 and the holder 12.

The compressed air supply connected to the connector 64 is advantageously usable to supply via the assembly 10 a so-called "push up" device for assisting extraction from the mold bottom by application of a jet of compressed air.

The invention claimed is:

1. An assembly (10) for fixing, with fluid connection, a mold bottom to a holder (12), in which the mold bottom with its main axis (O) is adapted to be demountably fastened to a plate (14) forming an interface between the mold bottom and said holder (12), said assembly (10) including at least:

a locking device which, operative between the plate (14) and the holder (12), includes first locking means (44) carried by the holder (12) and complementary second locking means (40) carried at least by the plate (14), said locking device being able to occupy at least:
a locked state in which the plate (14) is fastened to said holder (12), and
an unlocked state in which the plate (14) is free to be demounted from or mounted on said holder (12); and a fluid connection device which, operative between the plate (14) and the holder (12), includes at least first connecting means (46) carried by the holder (12) and adapted to cooperate with second connecting means (42) carried by the plate (14), the fluid connection device being able to occupy at least:
- a connected state in which a fluid circuit of the mold bottom is formed by virtue of the fluid connection established between the holder (12) and the plate (14) by said first connecting means (46) assembled with the second connecting means (42), and
- a separated state in which, said first connecting means (46) being separated from the second connecting means (42), said fluid circuit of the mold bottom is interrupted between the holder (12) and the plate (14), wherein the first locking means (44) and the first connecting means (46) are connected so as to move together by means of a mobile part (88) so as together to form a mobile subassembly.

2. The assembly as claimed in claim 1, wherein, the plate (14) being mounted on the holder (12), locking and establishing the fluid connection, and likewise unlocking and interrupting the fluid connection, are obtained simultaneously by driving movement of said mobile subassembly.

3. The assembly as claimed in claim 1, wherein said mobile subassembly is adapted to be moved between at least:
- a first position in which the locking device occupies the locked state and the fluid connection device occupies the connected state, and
- a second position in which the locking device occupies the unlocked state and the fluid connection device occupies the separated state.

4. The assembly as claimed in claim 3, wherein said mobile subassembly moves between said first and second positions in a direction that is not parallel to the main axis (O) of the mold bottom.

5. The assembly as claimed in claim 3, wherein return spring means (90a, 90b) are disposed between said part (88) formed by a mobile wall and a fixed partition (72) of the holder (12) so as to urge said mobile wall (88) toward at least one of said first and second positions.

6. The assembly as claimed in claim 5, wherein the return spring means (90a, 90b) urge the mobile wall toward the first position of the mobile subassembly so as to obtain on the one hand automatic return to the locked state and on the other hand assistance with the fluid connection when assembling the first connecting means (46) and the second connecting means (42).

7. The assembly as claimed in claim 3, wherein the assembly includes an actuating device (50) which, associated with said mobile subassembly, is adapted to act selectively on the mobile subassembly to drive movement thereof between the first and second positions.

8. The assembly as claimed in claim 7, wherein the actuating device (50) is an actuator including at least one chamber (78) associated with a piston (80) which, forming an actuating member, is mounted in fluid-tight manner in a bore (84) of the holder (12) and driven by means of said chamber (78) to drive movement of said mobile subassembly between said first and second positions.

9. The assembly as claimed in claim 1, wherein the first connecting means (46) comprise at least one male-type spigot (46a, 46b) that is adapted to be received in a complementary female-type connector (42a, 42b) forming the second connecting means (42).

10. The assembly as claimed in claim 6, wherein the first locking means (46) carried by the mobile wall (88) comprise at least two arms (44a, 44b) each adapted to cooperate with a complementary pin (40a, 40b) of the plate (14) forming said second locking means (40).

11. The assembly as claimed in claim 2, wherein said mobile subassembly is adapted to be moved between at least:
- a first position in which the locking device occupies the locked state and the fluid connection device occupies the connected state, and
- a second position in which the locking device occupies the unlocked state and the fluid connection device occupies the separated state.

12. The assembly as claimed in claim 4, wherein return spring means (90a, 90b) are disposed between said part (88) formed by a mobile wall and a fixed partition (72) of the holder (12) so as to urge said mobile wall (88) toward at least one of said first and second positions.

13. The assembly as claimed in claim 2, wherein the first connecting means (46) comprise at least one male-type spigot (46a, 46b) that is adapted to be received in a complementary female-type connector (42a, 42b) forming the second connecting means (42).

14. The assembly as claimed in claim 3, wherein the first connecting means (46) comprise at least one male-type spigot (46a, 46b) that is adapted to be received in a complementary female-type connector (42a, 42b) forming the second connecting means (42).

15. The assembly as claimed in claim 4, wherein the first connecting means (46) comprise at least one male-type spigot (46a, 46b) that is adapted to be received in a complementary female-type connector (42a, 42b) forming the second connecting means (42).

16. The assembly as claimed in claim 5, wherein the first connecting means (46) comprise at least one male-type spigot (46a, 46b) that is adapted to be received in a complementary female-type connector (42a, 42b) forming the second connecting means (42).

17. The assembly as claimed in claim 6, wherein the first connecting means (46) comprise at least one male-type spigot (46a, 46b) that is adapted to be received in a complementary female-type connector (42a, 42b) forming the second connecting means (42).

18. The assembly as claimed in claim 7, wherein the first connecting means (46) comprise at least one male-type spigot (46a, 46b) that is adapted to be received in a complementary female-type connector (42a, 42b) forming the second connecting means (42).

19. The assembly as claimed in claim 8, wherein the first connecting means (46) comprise at least one male-type spigot (46a, 46b) that is adapted to be received in a complementary female-type connector (42a, 42b) forming the second connecting means (42).

20. The assembly as claimed in claim 11, wherein the first connecting means (46) comprise at least one male-type spigot (46a, 46b) that is adapted to be received in a complementary female-type connector (42a, 42b) forming the second connecting means (42).

* * * * *